(12) United States Patent
Hsu

(10) Patent No.: US 10,429,603 B2
(45) Date of Patent: Oct. 1, 2019

(54) OPTICAL FIBER CASSETTE WITH CORRESPONDING RAIL STRUCTURES

(71) Applicant: ADVANCED-CONNECTEK INC., New Taipei (TW)

(72) Inventor: Huan-Pin Hsu, New Taipei (TW)

(73) Assignee: Advanced-Connectek Inc., New Taipei (TW)

( * ) Notice: Subject to any disclaimer, the term of this patent is extended or adjusted under 35 U.S.C. 154(b) by 0 days.

(21) Appl. No.: 15/913,146

(22) Filed: Mar. 6, 2018

(65) Prior Publication Data

US 2018/0259736 A1     Sep. 13, 2018

(30) Foreign Application Priority Data

Mar. 7, 2017  (TW) .............................. 106203187 U

(51) Int. Cl.
 *G02B 6/00* (2006.01)
 *G02B 6/44* (2006.01)

(52) U.S. Cl.
 CPC .................... *G02B 6/4455* (2013.01)

(58) Field of Classification Search
 CPC ... G02B 6/4455; G02B 6/4453; G02B 6/4446
 USPC ........................................................ 385/135
 See application file for complete search history.

(56) References Cited

U.S. PATENT DOCUMENTS

| | | | |
|---|---|---|---|
| 2002/0012238 A1* | 1/2002 | Takahashi ............ | G02B 6/3897 361/796 |
| 2005/0025444 A1* | 2/2005 | Barnes .................. | A47B 88/08 385/135 |
| 2009/0129033 A1* | 5/2009 | Smrha .................... | H04Q 1/142 361/732 |
| 2010/0054684 A1* | 3/2010 | Cooke .................. | G02B 6/4452 385/135 |

* cited by examiner

*Primary Examiner* — Kaveh C Kianni
*Assistant Examiner* — Hung Q Lam
(74) *Attorney, Agent, or Firm* — Muncy, Geissler, Olds & Lowe, P.C.

(57) ABSTRACT

An optical fiber cassette with corresponding rail structures includes a plurality of rail structures and an optical fiber cassette. Each rail structure includes a front flexible buckling arm and a rear buckling hook. The front flexible buckling arm includes a first suspended arm reflexed from a front portion of the rail structure and a stopping block formed on an end portion of the first suspended arm. The optical fiber cassette is located between the corresponding rail structures. The optical fiber cassette includes a front engaging block corresponding to the front flexible buckling arm and a rear buckling arm corresponding to the rear buckling hook. The rear flexible buckling arm includes a second suspended arm reflexed from a rear portion of the optical fiber cassette and an engaging hook formed on an end portion of the second suspended arm.

10 Claims, 9 Drawing Sheets

OPTICAL FIBER CASSETTE WITH CORRESPONDING RAIL STRUCTURES

CROSS-REFERENCE TO RELATED APPLICATION

This non-provisional application claims priority under 35 U.S.C. § 119(a) to Patent Application No. 106203187 in Taiwan, R.O.C. on Mar. 7, 2017, the entire contents of which are hereby incorporated by reference.

FIELD OF THE INVENTION

The instant disclosure relates to rail structures for an optical fiber cassette, and more particular to an optical fiber cassette with corresponding rail structures.

BACKGROUND

Internets are widely used. For short-distance transmission, the data is transmitted by coaxial cables. The transmission limitation for the coaxial cables is about 500 meters. On the other hand, for long-distance transmission, to ensure the safety and stability of the data transmission, optical fibers are applied for the transmission.

Fiber-optic communication becomes a popular wireless communication means in which information to be transmitted is inputted in a transmitter at a transmitting end, and the information is superimposed or modulated to a carrier wave which is served as an information carrier, then the modulated carrier wave passes the transmission medium and transmitted to a receiving end at remote where a receiver is applied to demodulated the original information.

A conventional drawer-type receiving box includes an optical fiber cassette, a cassette tray, etc. The optical fiber cassette is a slidable drawer. The optical fiber cassette is received between two rails on the cassette tray and the user has to operate the box with two hands. In other words, when the optical fiber cassette is to be detached from the rails, the user has to use one hand to press a released portion between the cassette and the rail (a derail structure) to keep the released portion being opened, so that the user can use the other hand to take the optical fiber cassette from the rails. Such two-hand operation is not convenient for the user. Specifically, when the user has to perform the installation of the optical fiber cassette in a small space like a cabinet with the optical fiber cassette and to insert several transmission cables into the optical fiber cassette, the user cannot perform the operation conveniently. Consequently, how to improve the problem becomes an issue.

SUMMARY OF THE INVENTION

In view of this, an embodiment of the instant disclosure provides an optical fiber cassette with corresponding rail structures. The replacing device comprises a plurality of rail structures and an optical fiber cassette. The rail structure comprises a front flexible buckling arm and a rear buckling hook. The front flexible buckling arm comprises a first suspended arm reflexed from a front portion of the rail structure and a stopping block formed on an end portion of the first suspended arm. The optical fiber cassette is located between the rail structures. The optical fiber cassette comprises a front engaging block corresponding to the front flexible buckling arm and a rear buckling arm corresponding to the rear buckling hook. The rear flexible buckling arm comprises a second suspended arm reflexed from a rear portion of the optical fiber cassette and an engaging hook formed on an end portion of the second suspended arm. When the optical fiber cassette is inserted between the rail structures from a first inserting side, the front engaging block is buckled with the front flexible buckling arm of one of the rail structures. When the front flexible cassette is detached from the rail structures from the first inserting side, the optical fiber cassette is detached form the rail structures from the first inserting side. When the optical fiber cassette is inserted between the rail structures from a second inserting side, the rear flexible buckling arm is buckled with the rear buckling hook of one of the rail structures. When the rear flexible buckling arm is pressed and detached from the rear buckling hook, the optical fiber cassette is detached from the rail structures form the second inserting side.

In one embodiment, the stopping block comprises a first front guiding bevel, and the front engaging block comprises a second front guiding bevel corresponding to the first front guiding bevel.

In one embodiment, the rear buckling hook comprises a reversed hook and a buckling groove formed in the reversed hook, the engaging hook is engaged with the reversed hook and the buckling groove.

In one embodiment, the rear buckling hook comprises a first rear guiding bevel, and the engaging hook comprises a second rear guiding bevel corresponding to the first rear guiding bevel.

In one embodiment, the stopping block and the rear buckling hook are respectively located at a side portion of the rail structure. The stopping block is located at an upper portion of the front portion of the rail structure. The rear buckling hook is located at a lower portion of a rear portion of the rail structure.

In one embodiment, the side portion of the rail structure comprises a sliding block, and the engaging hook is limited on the sliding block.

In one embodiment, the rail structure comprises a sliding groove formed on a bottom of the sliding block, and a side portion of the optical fiber cassette comprises a protruding block corresponding to the sliding groove.

In one embodiment, the front engaging block is movable along a first horizontal line at the side portion of the rail structure, the engaging hook is movable along a second horizontal line at the side portion of the rail structure, a travelling path of the first horizontal line is different from a travelling path of the second horizontal line.

In one embodiment, the front flexible buckling arm is extending from the front portion of the rail structure, the rear flexible buckling arm is extending from the rear portion of the optical fiber cassette.

In one embodiment, the rail structure comprises a first recess for receiving the front flexible buckling arm, and the optical fiber cassette comprises a second recess for receiving the rear flexible buckling arm.

As above, according to some embodiments of the instant disclosure, an operator (i.e., repair personnel) can operate the second suspended arm with one hand, and the operator can press the second suspended arm to pull the optical fiber cassette from the rail structures or to put the optical fiber cassette in the rail structures, from the rear portion of the rail structures. Hence, the operation of the optical fiber cassette can be rather convenient than the conventional. Furthermore, a user can press the front flexible buckling arm of the rail structure, so that the front engaging block is not limited by the front flexible buckling arm. Thus, the user can pull the optical fiber cassette from the rail structures or to put the optical fiber cassette in the rail structures, from the front portion of the rail structures.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
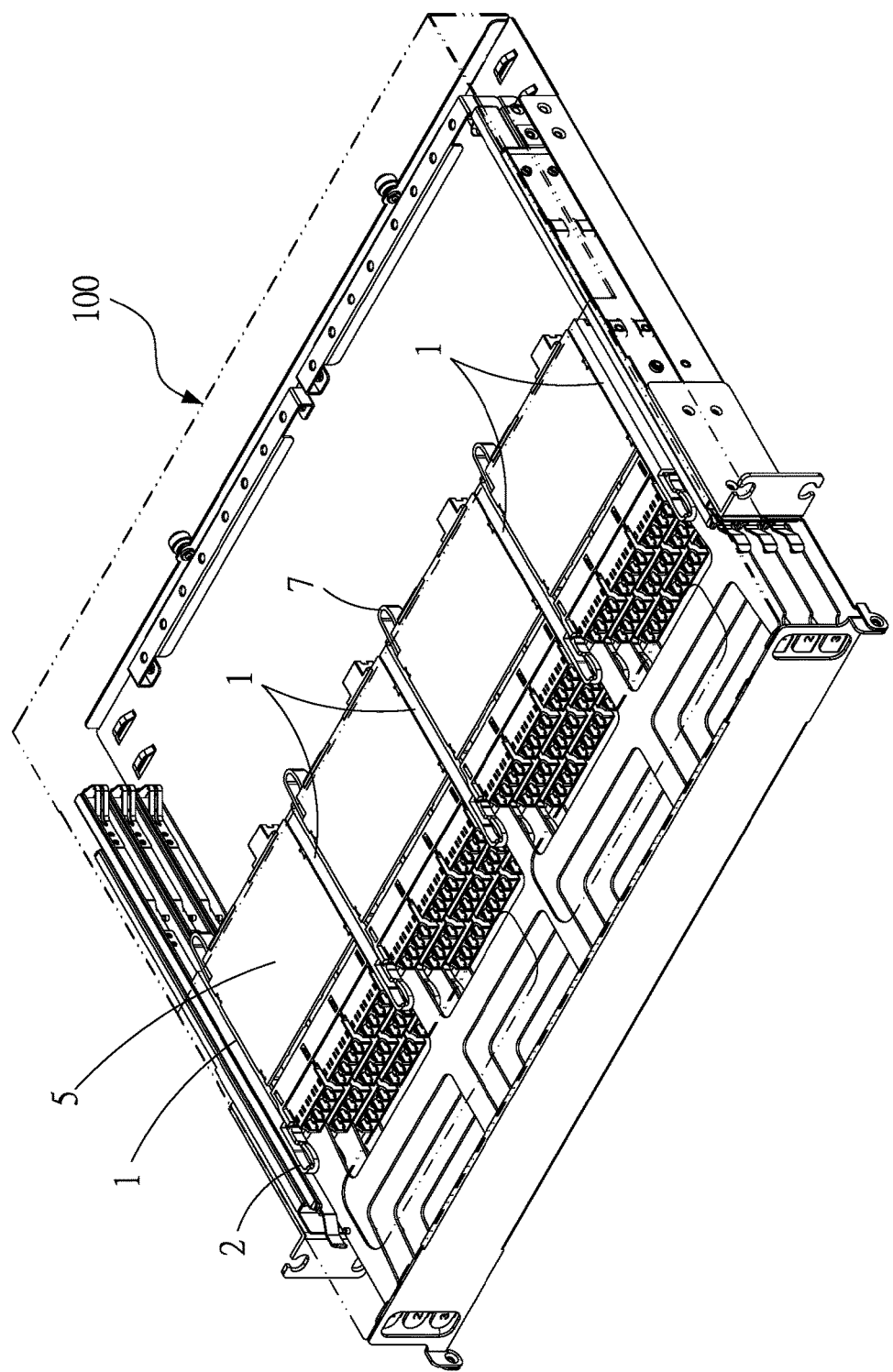
FIG. 1 illustrates a perspective view showing an optical fiber cassette with corresponding rail structures according to an exemplary embodiment of the instant disclosure.
Figure 2:
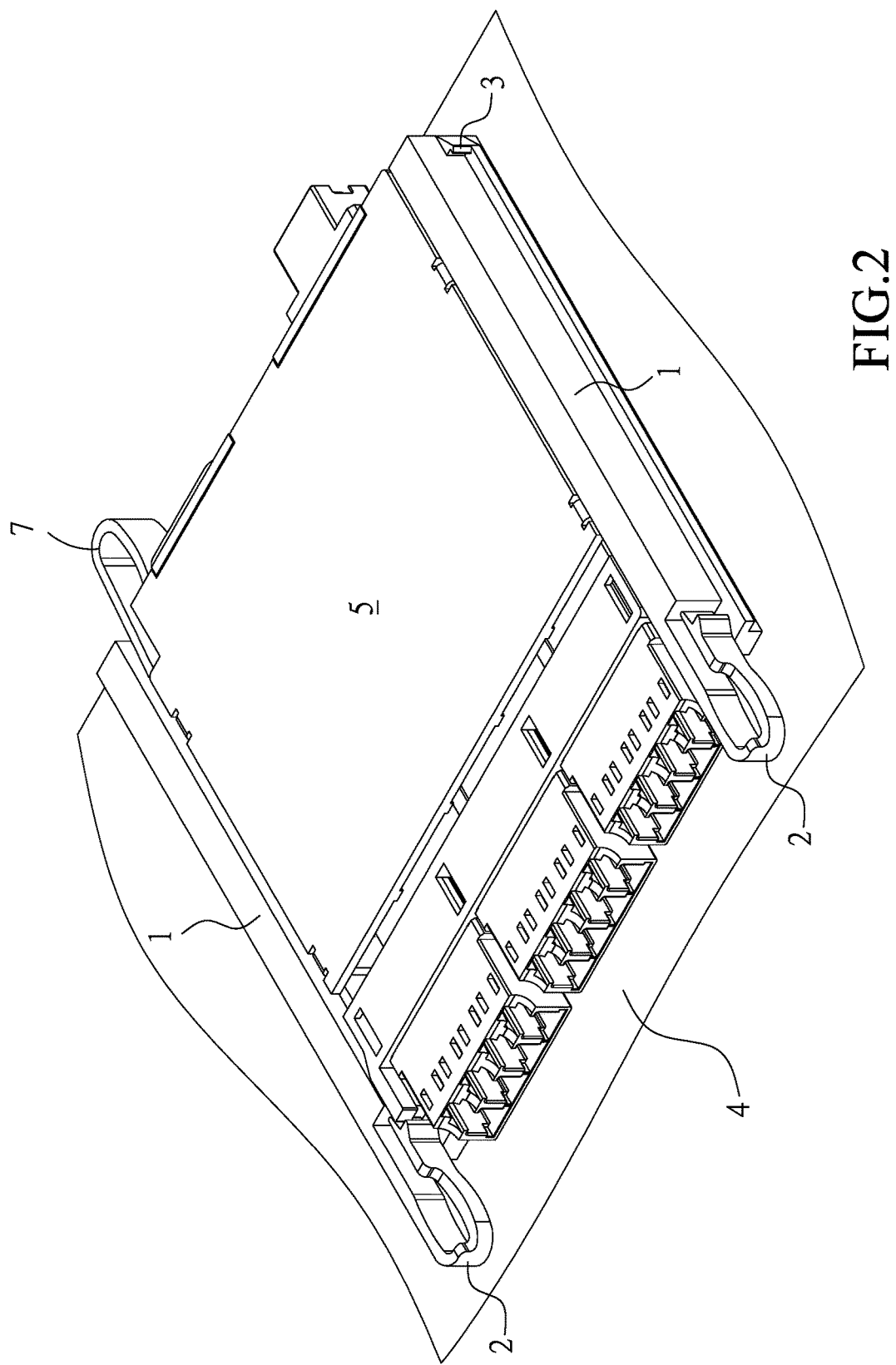
FIG. 2 illustrates a partial perspective view of the optical fiber cassette with corresponding rail structures.
Figure 3:
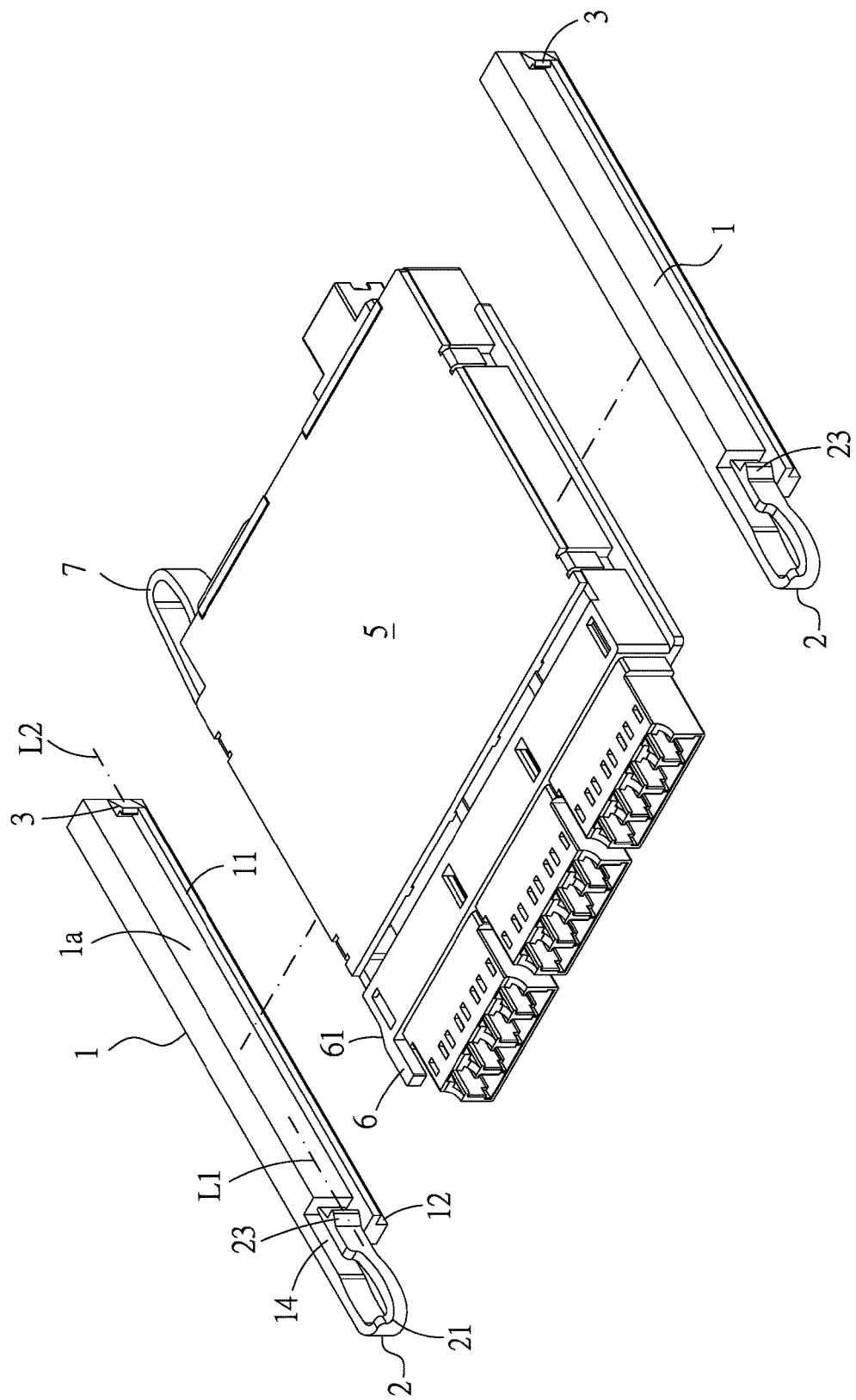
FIG. 3 illustrates a partial exploded view (1) of the optical fiber cassette with corresponding rail structures.
Figure 4:
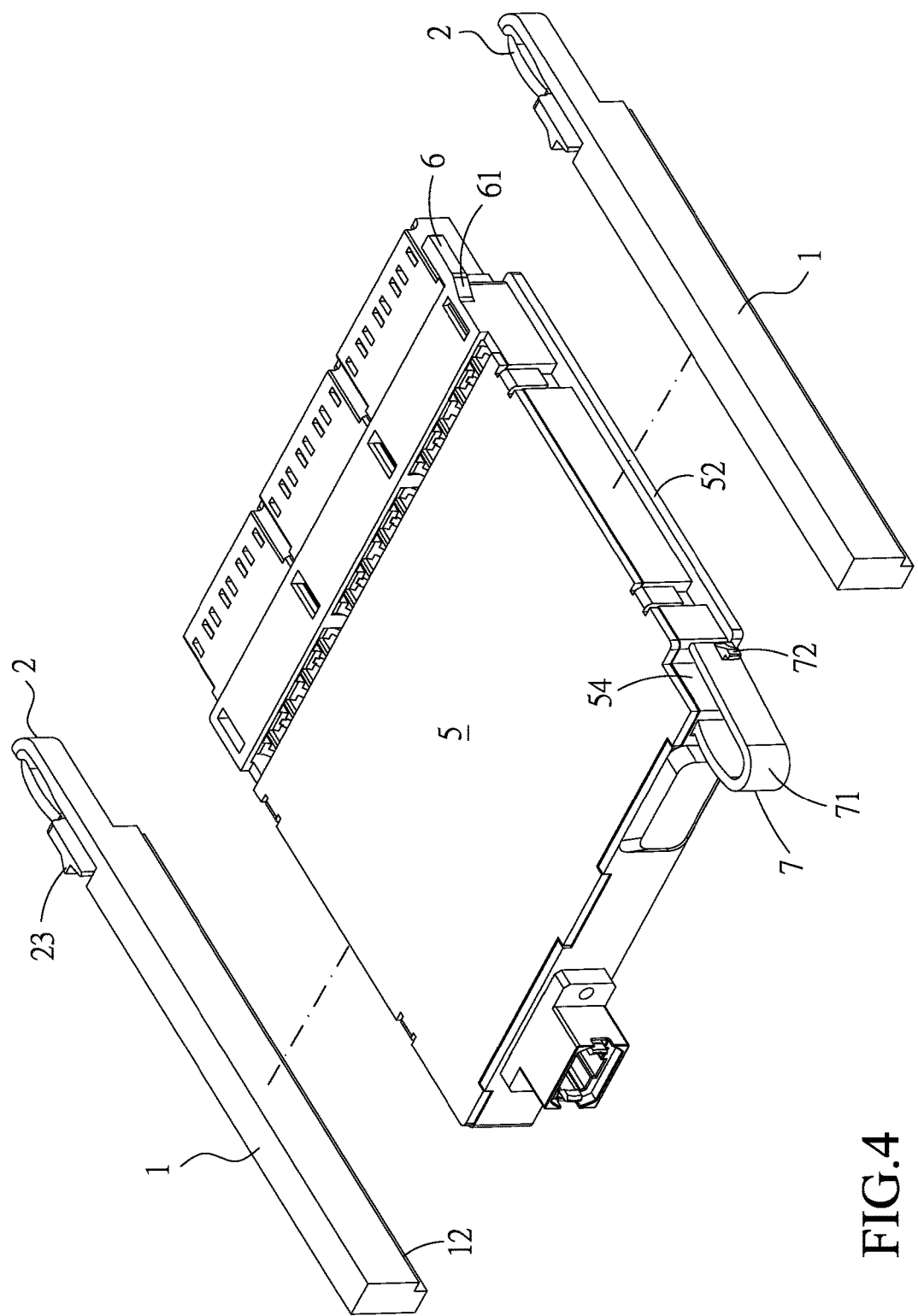
FIG. 4 illustrates a partial exploded view (2) of the optical fiber cassette with corresponding rail structures.

Please refer to FIGS. 1 to 4. FIG. 1 illustrates a perspective view showing an optical fiber cassette with corresponding rail structures according to an exemplary embodiment of the instant disclosure. FIG. 2 illustrates a partial perspective view of the optical fiber cassette with corresponding rail structures. FIG. 3 illustrates a partial exploded view (1) of the optical fiber cassette with corresponding rail structures. FIG. 4 illustrates a partial exploded view (2) of the optical fiber cassette with corresponding rail structures. FIG. 1 illustrates a perspective view of an optical fiber box 100. The optical fiber box 100 comprises a plurality of optical fiber cassettes with corresponding rail structures, and the optical fiber cassettes with corresponding rail structures are respectively arranged on plate members in the rack-type optical fiber box 100. The optical fiber cassette with corresponding rail structures comprises a plurality of rail structures 1 and an optical fiber cassette 5, and the optical fiber cassette 5 is movably assembled between two rail structures 1.

Figure 5:
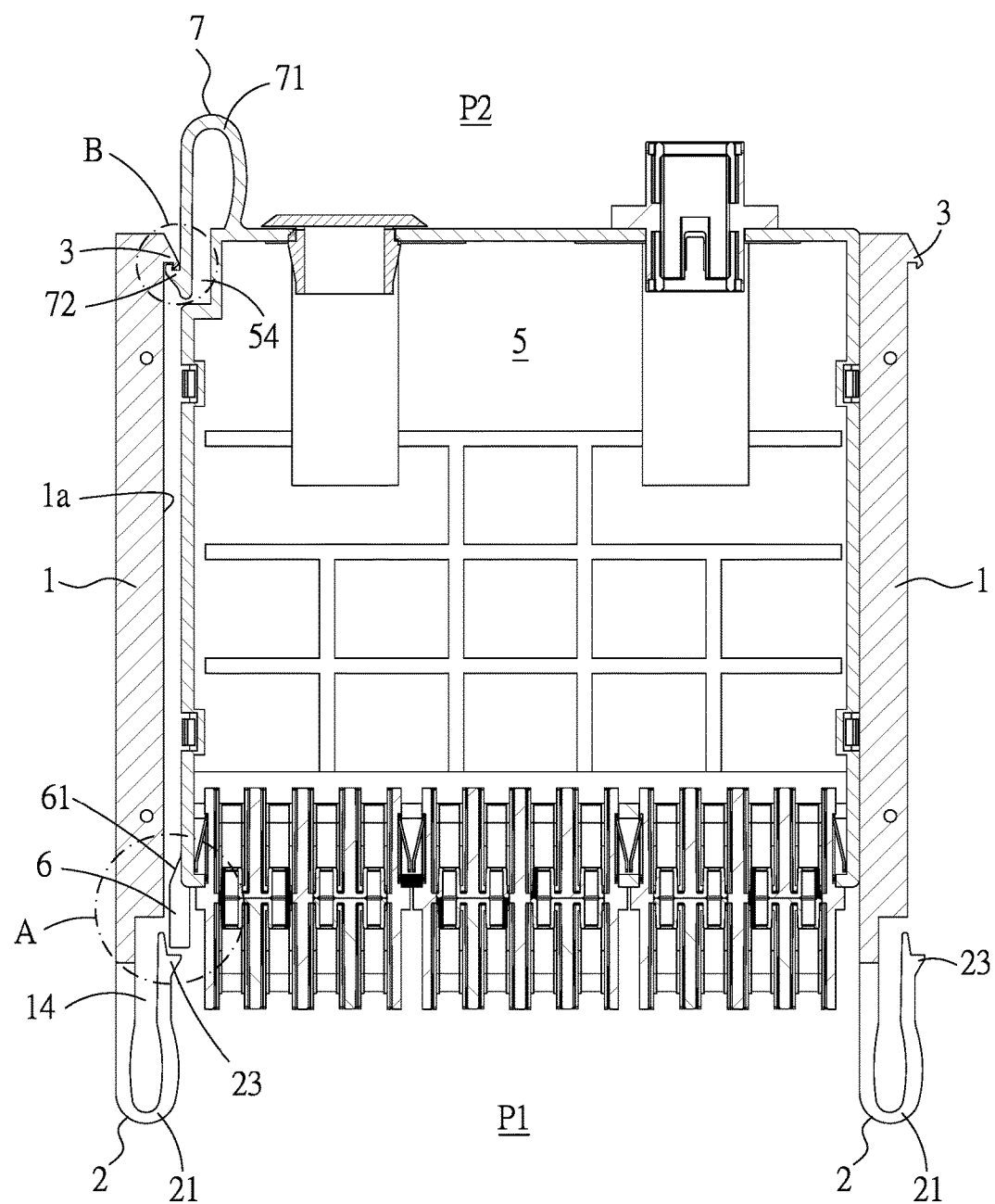
FIG. 5 illustrates a top sectional view of rail structures and an optical fiber cassette according to the instant disclosure.

Please refer to FIGS. 2 to 5. FIG. 5 illustrates a top sectional view of rail structures and an optical fiber cassette according to the instant disclosure. In this embodiment, each rail structure 1 is an elongated plastic base, and the rail structures 1 are aligned in a same orientation and spaced apart from adjacent rail structures 1. Each of the rail structures 1 comprises a front flexible buckling arm 2 and a rear buckling hook 3, and the front flexible buckling arm 2 is extending from a front portion of the rail structure 1, and the user can hold the front flexible buckling arm 2. The front flexible buckling arm 2 comprises a first suspended arm 21 reflexed from the front portion of the rail structure 1 and a stopping block 23 formed on an end portion of the first suspended arm 21. The first suspended arm 21 is approximately of a U shape, while the stopping block 23 is approximately of an L shape. Furthermore, the rear buckling hook 3 comprises a reversed hook 33 and a buckling groove 34 formed in the reversed hook 33.

Figure 6:
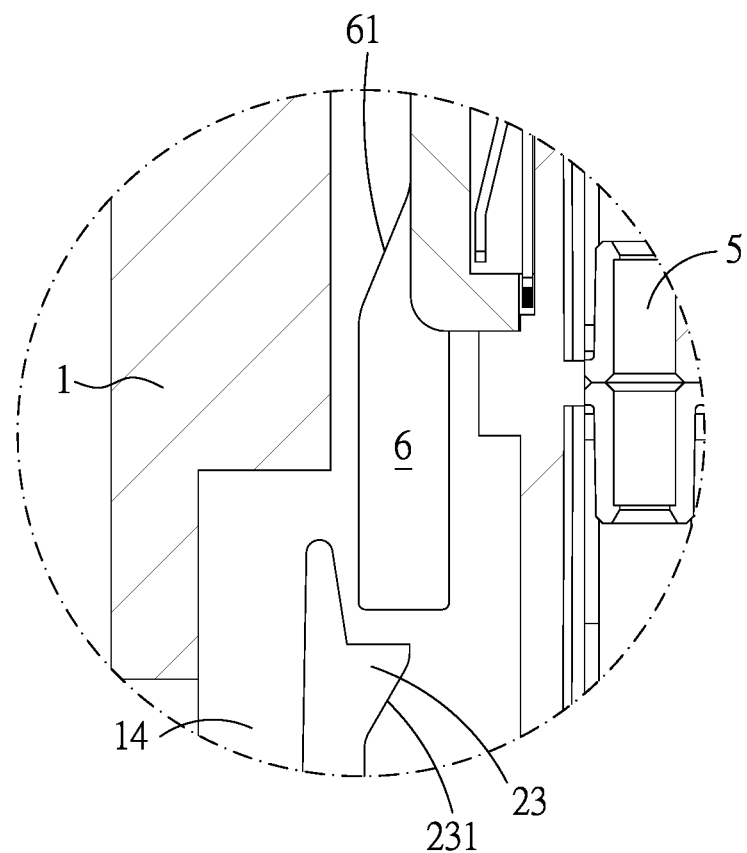
FIG. 6 illustrates an enlarged view of the portion A shown in FIG. 5.

Please refer to FIGS. 2 to 6. FIG. 6 illustrates an enlarged view of the portion A shown in FIG. 5. In this embodiment, the optical fiber cassette 5 is located between two of the rail structures 1. The optical fiber cassette 5 comprises a front engaging block 6 corresponding to the front flexible buckling arm 2 and a rear flexible buckling arm 7 corresponding to the rear buckling hook 3. The rear flexible buckling arm 7 is extending from a rear portion of the optical fiber cassette 5, and the user can hold the rear flexible buckling arm 7. The rear flexible buckling arm 7 comprises a second suspended arm 71 reflexed from the rear portion of the optical fiber cassette 5 and an engaging hook 72 formed on an end portion of the second suspended arm 71. The second suspended arm 71 is approximately of a U shape. The engaging hook 72 is engaged with the reversed hook 33 and the buckling groove 34.

Please refer to FIGS. 2 to 7. The rail structure 1 comprises a first recess 14 for receiving the front flexible buckling arm 2. The optical fiber cassette 5 comprises a second recess 54 for receiving the second flexible buckling arm 7.

Figure 7:
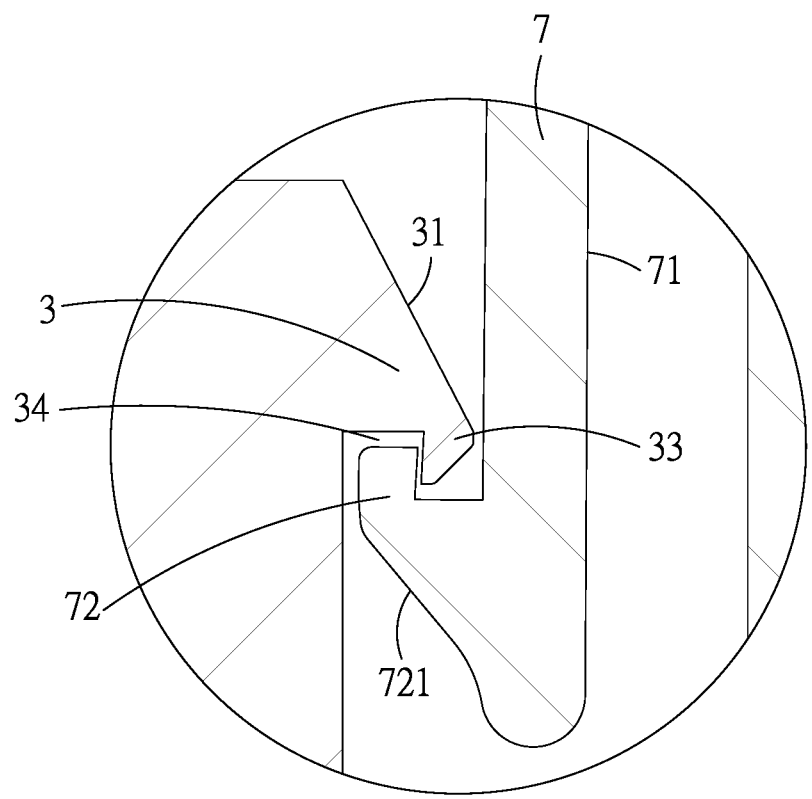
FIG. 7 illustrates an enlarged view of the portion B shown in FIG. 5.
Figure 8:
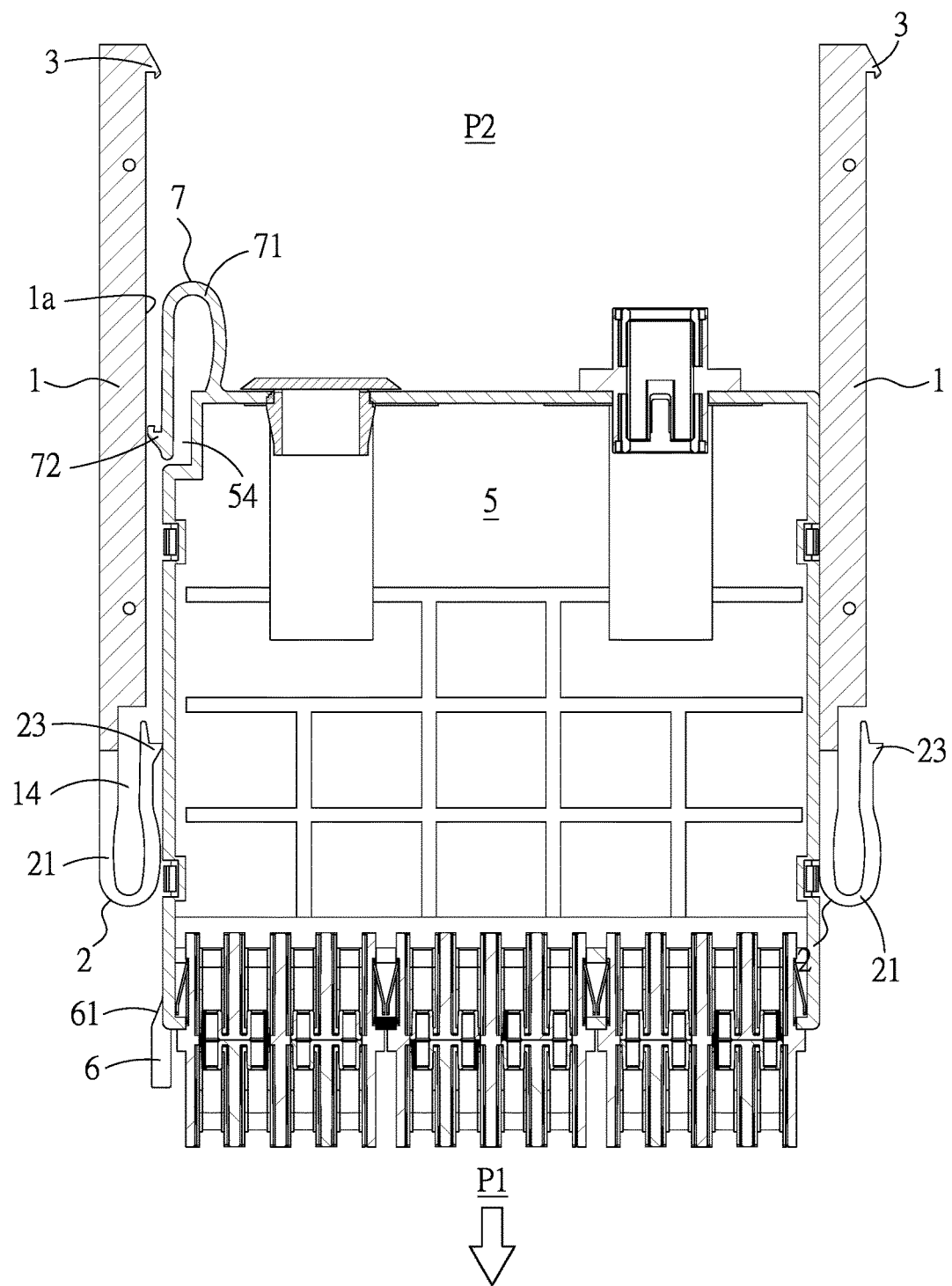
FIG. 8 illustrates a top sectional view showing that the optical fiber cassette is pulled from the front portion of the rail structures.
Figure 9:
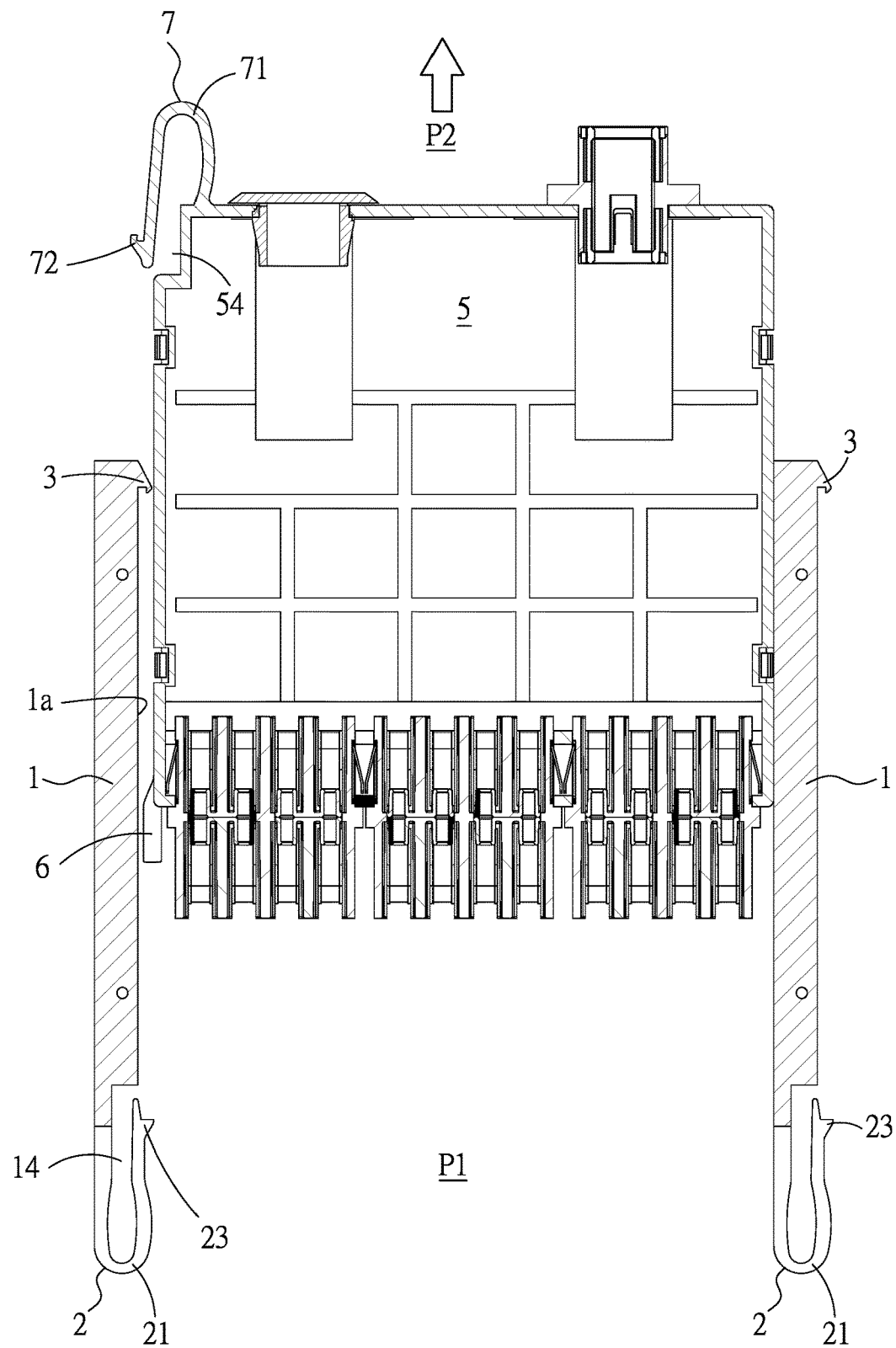
FIG. 9 illustrates a top sectional view showing that the optical fiber cassette is pulled from the rear portion of the rail structures.

Please refer to FIGS. 5 to 9. FIG. 7 illustrates an enlarged view of the portion B shown in FIG. 5. FIG. 8 illustrates a top sectional view showing that the optical fiber cassette is pulled from the front portion of the rail structures. FIG. 9 illustrates a top sectional view showing that the optical fiber cassette is pulled from the rear portion of the rail structures. As shown, when the optical fiber cassette 5 is inserted between the rail structures 1 from a first inserting side P1, the front engaging block 6 is buckled with the front flexible buckling arm 2. Conversely, when the front flexible buckling arm 2 is pressed and detached from the front engaging block 6, the optical fiber cassette 5 is detached from the rail structures 2 from the first inserting side P1. The first inserting side P1 is a user-end operation region. The user can press the front flexible buckling arm 2 then pull the optical fiber cassette 5 out of the rail structures 1 for replacing the optical fiber cassette 5.

Please refer to FIGS. 5 to 9. As shown, when the optical fiber cassette 5 is inserted between the rail structures 1 from a second inserting side P2, the rear flexible buckling arm 7 is buckled with the rear buckling hook 3. Conversely, when the rear flexible buckling arm 7 is pressed and detached from the rear buckling hook 3, the optical fiber cassette 5 is detached from the rail structures 1 from the second inserting side P2. The second inserting side P2 is an operator-end operation region. The operator (e.g., the repairman) can press the rear flexible buckling arm 7 with one hand and pull the optical fiber cassette 5 out of the rail structures 1 for replacing or repairing the optical fiber cassette 5.

Please refer to FIGS. 6 and 7. In this embodiment, the stopping block 23 comprises a first front guiding bevel 231, and the front engaging block 6 comprises a second front guiding bevel 61 corresponding to the first front guiding bevel 231. The first front guiding bevel 231 corresponds to the second front guiding bevel 61, and the first front guiding bevel 231 is in area-contact with the second front guiding bevel 61 when the optical fiber cassette 5 is inserted between the rail structures 1 from a front portion of the rail structures 1. When the optical fiber cassette 5 is inserted between the rail structures 1 from the front portion of the rail structures 1, the first suspended arm 21 is pressed so as to be elastically compressed. Then, when the front engaging block 6 is positioned, the first suspended arm 21 rebounds resiliently, and the stopping block 23 limits the front engaging block 6 and prevents the optical fiber cassette 5 from being detached off the front portion of the rail structures 1. Conversely, when the optical fiber cassette 5 is to be detached from the first inserting side P1, the first suspended arm 21 is pressed so as to be compressed. Next, because the front engaging block 6 of the optical fiber cassette 5 is not buckled by the front flexible buckling arm 2, the optical fiber cassette 5 can be detached from the rail structures 1 from the first inserting side P1.

Please refer to FIGS. 6 and 7. In this embodiment, the rear buckling hook 3 comprises a first rear guiding bevel 31, and the engaging hook 72 comprises a second rear guiding bevel 721 corresponding to the first rear guiding bevel 31. The first rear guiding bevel 31 corresponds to the second rear guiding bevel 721, and the first rear guiding bevel 31 is in area-contact with the second rear guiding bevel 721 when the optical fiber cassette 5 is inserted between the rail structures 1 from a rear portion of the rail structures 1. When the optical fiber cassette 5 is inserted between the rail structures 1 from the rear portion of the rail structures 1, the second suspended arm 71 is pressed so as to be elastically compressed. Then, when the engaging hook 72 is positioned, the second suspended arm 71 rebounds resiliently, and the engaging hook 72 limits the rear buckling hook 3 and prevents the optical fiber cassette 5 from being detached off the rear portion of the rail structures 1. Conversely, when the optical fiber cassette 5 is to be detached form the second inserting side P2, the second suspended arm 71 is pressed so as to be compressed. Next, because the engaging hook 72 of the optical fiber cassette 5 is detached from the rear buckling hook 3, the user can pull the rear flexible buckling arm 7 with one hand and detach the optical fiber cassette 5 from the rail structures 1 from the second inserting side P2.

Please refer to FIGS. 2 to 5. The stopping block 23 and the rear buckling hook 3 are respectively located at the side portion 1a of the rail structure 1. The stopping block 23 is located at an upper portion of the front portion of the rail structure 1, and the rear buckling hook 3 is located at a lower portion of a rear portion of the rail structure 1. Moreover, the side portion 1a of the rail structure 1 comprises a sliding block 11, and the engaging hook 72 is limited on the sliding block 11. Furthermore, the rail structure 1 comprises a sliding groove 12 formed on a bottom of the sliding block 11. A side portion of the optical fiber cassette 5 comprises a protruding block 52 corresponding to the sliding groove 12, and the protruding block 52 is limited to be slidable in the sliding groove 12.

Please refer to FIGS. 2 to 5. The front engaging block 6 is movable along a first horizontal line L1 at the side portion 1a of the rail structure 1. The engaging hook 72 is movable along a second horizontal line L2 at the side portion 1a of the rail structure 1. A travelling path of the first horizontal line L1 is different from a travelling path of the second horizontal line L2. When the optical fiber cassette 5 is moved between the rail structures 1 back and forth, the travelling path of the front engaging block 6 does not overlap with the travelling path of the engaging hook 72. Hence, the front engaging block 6 will not impact the rear buckling hook 3 of the rail structure 1, and the engaging hook 72 will not impact the front flexible buckling arm 2 of the rail structure 1. Accordingly, the optical fiber cassette 5 can be put in or detached from the rail structures 1 from the first inserting side P1 or the second inserting side P2.

As above, according to some embodiments of the instant disclosure, an operator (i.e., repair personnel) can operate the second suspended arm with one hand, and the operator can press the second suspended arm to pull the optical fiber cassette from the rail structures or to put the optical fiber cassette in the rail structures, from the rear portion of the rail structures. Hence, the operation of the optical fiber cassette can be rather convenient than the conventional. Furthermore, a user can press the front flexible buckling arm of the rail structure, so that the front engaging block is not limited by the front flexible buckling arm. Thus, the user can pull the optical fiber cassette from the rail structures or to put the optical fiber cassette in the rail structures, from the front portion of the rail structures.

What is claimed is:

1. An optical fiber cassette with corresponding rail structures, comprising:
   an optical fiber cassette located between the corresponding rail structures, wherein the optical fiber cassette comprises a front engaging block and a rear flexible buckling arm, the rear flexible buckling arm comprises a second suspended arm reflexed from a rear portion of the optical fiber cassette and an engaging hook formed on an end portion of the second suspended arm;
   wherein, each rail structure comprises a front flexible buckling arm and a rear buckling hook, wherein the front engaging block is corresponding to the front flexible buckling arm, and the rear flexible buckling arm corresponding to the rear buckling hook, and the front flexible buckling arm comprises a first suspended arm reflexed from a front portion of the rail structure and a stopping block formed on an end portion of the first suspended arm; and when the optical fiber cassette is inserted between the corresponding rail structures from a first inserting side, the front engaging block is buckled with the front flexible buckling arm of one of the rail structures, when the front flexible buckling arm is pressed and detached from the front engaging block, the optical fiber cassette is detached from the rail structures from the first inserting side; when the optical fiber cassette is inserted between the rail structures from a second inserting side, the rear flexible buckling arm is buckled with the rear buckling hook of one of the rail structures, when the rear flexible buckling arm is pressed and detached from the rear buckling hook, the optical fiber cassette is detached from the rail structures from the second inserting side.

2. The optical fiber cassette with corresponding rail structures according to claim 1, wherein the stopping block comprises a first front guiding bevel, and the front engaging block comprises a second front guiding bevel corresponding to the first front guiding bevel.

3. The optical fiber cassette with corresponding rail structures according to claim 1, wherein the rear buckling hook comprises a reversed hook and a buckling groove formed in the reversed hook, the engaging hook is engaged with the reversed hook and the buckling groove.

4. The optical fiber cassette with corresponding rail structures according to claim 3, wherein the rear buckling hook comprises a first rear guiding bevel, and the engaging hook comprises a second rear guiding bevel corresponding to the first rear guiding bevel.

5. The optical fiber cassette with corresponding rail structures according to claim 1, wherein the stopping block and the rear buckling hook are respectively located at a side portion of the rail structure, the stopping block is located at an upper portion of the front portion of the rail structure, and the rear buckling hook is located at a lower portion of a rear portion of the rail structure.

6. The optical fiber cassette with corresponding rail structures according to claim 5, wherein the side portion of the rail structure comprises a sliding block, and the engaging hook is limited on the sliding block.

7. The optical fiber cassette with corresponding rail structures according to claim 6, wherein the rail structure comprises a sliding groove formed on a bottom of the sliding block, and a side portion of the optical fiber cassette comprises a protruding block corresponding to the sliding groove.

8. The optical fiber cassette with corresponding rail structures according to claim 5, wherein the front engaging block is movable along a first horizontal line at the side portion of the rail structure, the engaging hook is movable along a second horizontal line at the side portion of the rail structure, a travelling path of the first horizontal line is different from a travelling path of the second horizontal line.

9. The optical fiber cassette with corresponding rail structures according to claim 1, wherein the front flexible buckling arm is extending from the front portion of the rail structure, the rear flexible buckling arm is extending from the rear portion of the optical fiber cassette.

10. The optical fiber cassette with corresponding rail structures according to claim 1, wherein the rail structure comprises a first recess for receiving the front flexible buckling arm, and the optical fiber cassette comprises a second recess for receiving the rear flexible buckling arm.

* * * * *